Aug. 4, 1936.   W. E. GUYOT   2,049,701
AUTOMOBILE BODY VENTILATING SYSTEM
Filed July 10, 1933
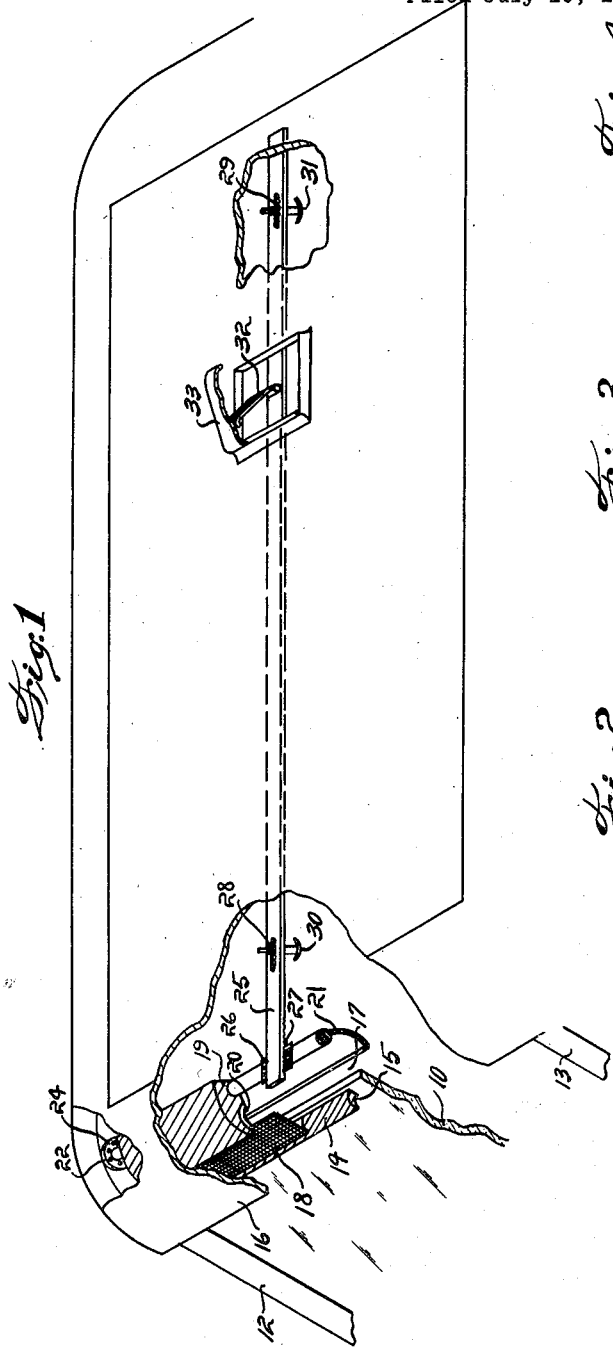
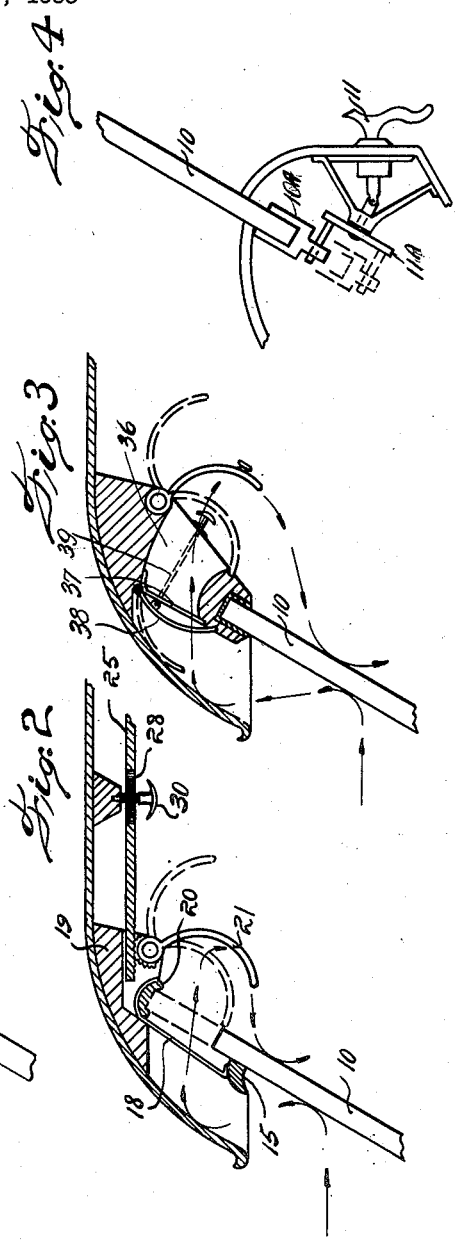
Walter C. Guyot
INVENTOR
BY
ATTORNEY Patented Aug. 4, 1936

2,049,701

UNITED STATES PATENT OFFICE 2,049,701

AUTOMOBILE BODY VENTILATING SYSTEM

Walter E. Guyot, Albuquerque, N. Mex.

Application July 10, 1933, Serial No. 679,602

5 Claims. (Cl. 98—2)

My invention relates generally to improvements in ventilating systems for automobiles and has for its primary object the provision of a simple mechanism for relative adjustment of the flow of fresh air from without to within an inclosed body of a car.

A further object of my invention is to provide means for controlling the flow of air from without to within the car body in a manner as to eliminate objectionable draft within the said body.

Another object is the provision of means whereby foul air and smoke can be readily expelled from the interior of the body without causing objectionable draft therein.

Still another object is to provide means whereby the interior of the wind shield may be kept from frosting up during severely cold weather.

Other objects and features will be apparent as the following description proceeds, as taken in connection with the accompanying drawing in which:

Fig. 1 is a partial perspective view, partly in cross section of an automobile body provided with a ventilating system made in accordance with the present invention.

Fig. 2 is a vertical section of a portion of the car body showing details of construction of a portion of the said ventilating system;

Fig. 3 is a vertical section of a portion of the car body; and

Fig. 4 is a detail view of the wind shield lowering mechanism.

In the drawing the numeral 10 designates a wind shield which is adapted to be lowered and raised by a lever 11. The actuating mechanism consists of a ball and socket drive connection and crank 11a which is attached to the bottom of the wind shield frame 10a. Oscillation of the crank assembly through the medium of the crank 11a causes the window to be raised or lowered. It is to be particularly noted that the construction of the wind shield 10 is such as to cause it to be lowered from the top rather than raised from the bottom.

Suspended between the upright posts 12 and 13 is a sealing member 14 against which the wind shield 10 is adapted to press. Said sealing member may be constructed of hard rubber or other similar material. The lower part of it is curved convexly as at 15, the purpose of which is to catch moisture which might be blown under the visor 16 in a severe storm and thus prevent the said moisture from passing through the aperture 17 formed when the wind shield is lowered.

A fine screen 18 is suspended across the front of the wind shield from one post to the other, the lower portion of said screen being fixed to the member 14 and the upper portion to the top frame or header member 19. The purpose of the screen is to prevent insects and particles of dirt from being blown into the car when the wind shield is lowered and the ventilating system is in operation.

A rubber sealing member 20 is fixed in the top frame member 19, the said rubber sealing member having a longitudinal extending groove in which the top edge of the wind shield is adapted to fit when the wind shield is in closed position.

A deflector member 21 is provided, the upper edge of which is hingedly mounted to the top frame member 19, the lower edge of which member is formed in a convex curve, the said curve being directed towards the wind shield. The said deflector member is pivotedly mounted in the side bracing member 22 of a car, the axis being through the center of the cylindrically formed top edge of the deflector member 21.

Stops 24 permit of relative adjustment in given degrees of the said deflector member away from and towards the wind shield. The stop arrangement includes a spring-impelled rounded-head pin which is affixed in the body portion and is adapted to engage depressions in the circular disk mounted on one extremity of the axis of the member 21 so that at different angles of adjustment of the deflector, the pin will engage respective indentations in the disk. The depth of the indentations are such that actuation of the levers 30 or 31 will cause the pin to be forced from the particular depression in which it has been seated and to travel over the adjoining flat space to the next depression where the spring will force it thereinto. The stop merely assists in holding the member 21 in a definite position as without the said stop vibration would cause the deflector to change position.

An adjustment rod 25 is positioned between the top and the inside lining of the said top as to permit of relative adjustment of the deflector means from the rear or front seat of the car. This adjustment means consists of a metal rod threaded as at 26 to engage co-related worm 27 formed on the top cylindrical edge of the deflector means.

Gear teeth 28 and 29 are formed on the said rod which are, in turn, engaged by the toothed shanks of adjustment handles 30 and 31, respectively, which are fixed to the bracing members in the top of the car and which extend into the interior of the car in positions directly over the front and rear seats.

A cam 32 hingedly affixed to the rear end of the rod 25 and to a hinged door in the top 33 is actuated by adjustment of the rod 25 to open and close door 33. It is quite evident that operation of either of the handles 30 or 31 will actuate the deflector away from or towards the wind shield, and at the same time open or close the exhaust door or ventilator 33.

The modification shown in Fig. 3 discloses my invention incorporated in a car body in which the wind shield is fixed. In a car having a wind shield of this type, a longitudinally extending slot 36 is cut adjacent to the top of the said shield, which slot is screened as at 37 and covered by an adjustable shutter 38 which may be regulated from the interior of the car through the medium of an actuating lever 39.

When the above described construction is used, the deflector is mounted adjacent the slot as to deflect air passing through the said slot against the wind shield. It is to be understood that in both constructions, the adjustment of the deflector is such that the said deflector may be opened to such an extent that the in-rushing air, instead of being deflected against the said shield, may be deflected directly into the driver's face.

The operation of my device is as follows:

When it is desired to introduce fresh air into the car body, the wind shield 10 is lowered by actuation of the lever 11 proportionately to the amount of fresh air that it is desired to introduce into the said body, and when the car is in motion air will rush through the screen 18 and thence through the opening caused by the lowering of the window against the deflector 21 where it will, in turn, be deflected against the wind shield 10, the amount of deflection depending entirely upon the position of the said deflector as respects the said wind shield.

Upon the deflection of the air currents from the deflector against the wind shield, the speed with which they enter the aperture will be materially reduced and a counter-pressure set up which causes the air to flow evenly and smoothly to the rear of the car, thus eliminating the blast of air caused by the opening of the ordinary wind shield or a side window which is so obnoxious to drivers and passengers at the present time.

Inasmuch as the rear exhaust door is open when the deflector is properly regulated for ventilation, the vacuum at the said aperture caused by the forward motion of the car will cause the foul air or smoke to be exhausted from the interior of the said car through the said door opening.

In the objects of the invention, it is stated that the device will prevent the wind shield from frosting up on the inside of the car during severely cold weather. Said frosting up of the wind shield is due to the fact that the expanse of wind shield on the inside is, of course, much warmer than the expanse on the outside of the car and extremely cold weather will cause moisture to form of the inside expanse thereof.

However, when the ventilator is in operation, the blast of deflected cold air striking the wind shield and traveling down the inner expanse thereof will cause the interior of the wind shield to assume practically the same temperature as the exterior and thus eliminate the so-called frosting.

Having described my invention, what I claim and desire to secure by Letters Patent is:

1. An automobile ventilating system comprising in combination a closed body, a vertically movable wind shield in the front of said body, an air deflector mounted in the top of said body adjacent the said wind shield, the deflector being so formed as to deflect air from the exterior of said body against the said shield, means for exhausting foul air from the said body and adjustment means operable from both the front and rear interior of said body whereby both the deflector and exhaust mechanisms may be operated simultaneously.

2. An automobile ventilating system comprising in combination a closed body, a vertically movable wind shield in the front of said body, said wind shield being adapted to be lowered from the top downward, an air deflector mounted in the top of the body adjacent the said wind shield, a fine mesh screen inclosing the orifice formed by the opening of the wind shield, means for exhausting foul air from the said body and adjustment means operable from both the front and rear interior thereof whereby both the deflector and exhaust mechanisms may be operated simultaneously.

3. In a motor vehicle, a body having a windshield header member and a windshield movable toward and away from said header member to cooperate therewith in the formation of an air inlet opening, means for moving said windshield, a deflector adjustably mounted on said header member upon the interior of said body adjacent said opening for selectively directing the incoming air into contact with one side of the windshield or in the direction of the occupants of the vehicle, means for exhausting foul air from said body, and an operating mechanism associated with said deflector and said foul air exhaust means and operable from both the front and rear interior of said body for simultaneously operating said deflector and said exhaust means.

4. In a motor vehicle, a body having a top and a windshield movable in a straight line to cooperate with the top of the body in the formation of an air inlet opening, means for moving said windshield, a deflector adjustably mounted upon the interior of said body adjacent said opening for selectively directing the incoming air into contact with one side of the windshield or in the direction of the occupants of the vehicle, a control device having operative connection with said deflector, and a ventilator in the body and having connection with said control device for operation in consonance with said deflector.

5. In a motor vehicle, a body having a movable windshield cooperating with the top of said body in the formation of an air inlet opening, means for moving said windshield, a deflector adjustably mounted upon the interior of said body adjacent said opening for selectively directing the incoming air into contact with one side of the windshield or in the direction of the occupants of the vehicle, a motion transmitting mechanism operatively connected to said deflector and extending lengthwise along the top of the body and having hand-operated means depending into the interior of the body whereby the occupants of the vehicle may adjust the deflector from a remote point, and a ventilator having an operative connection with said motion transmitting mechanism for actuation thereby so that the ventilator and the deflector are operated in consonance.

WALTER E. GUYOT.